(No Model.)
H. L. BAILEY.
CIRCUIT FOR SECONDARY ELECTRIC CLOCKS.
No. 284,355. Patented Sept. 4, 1883.
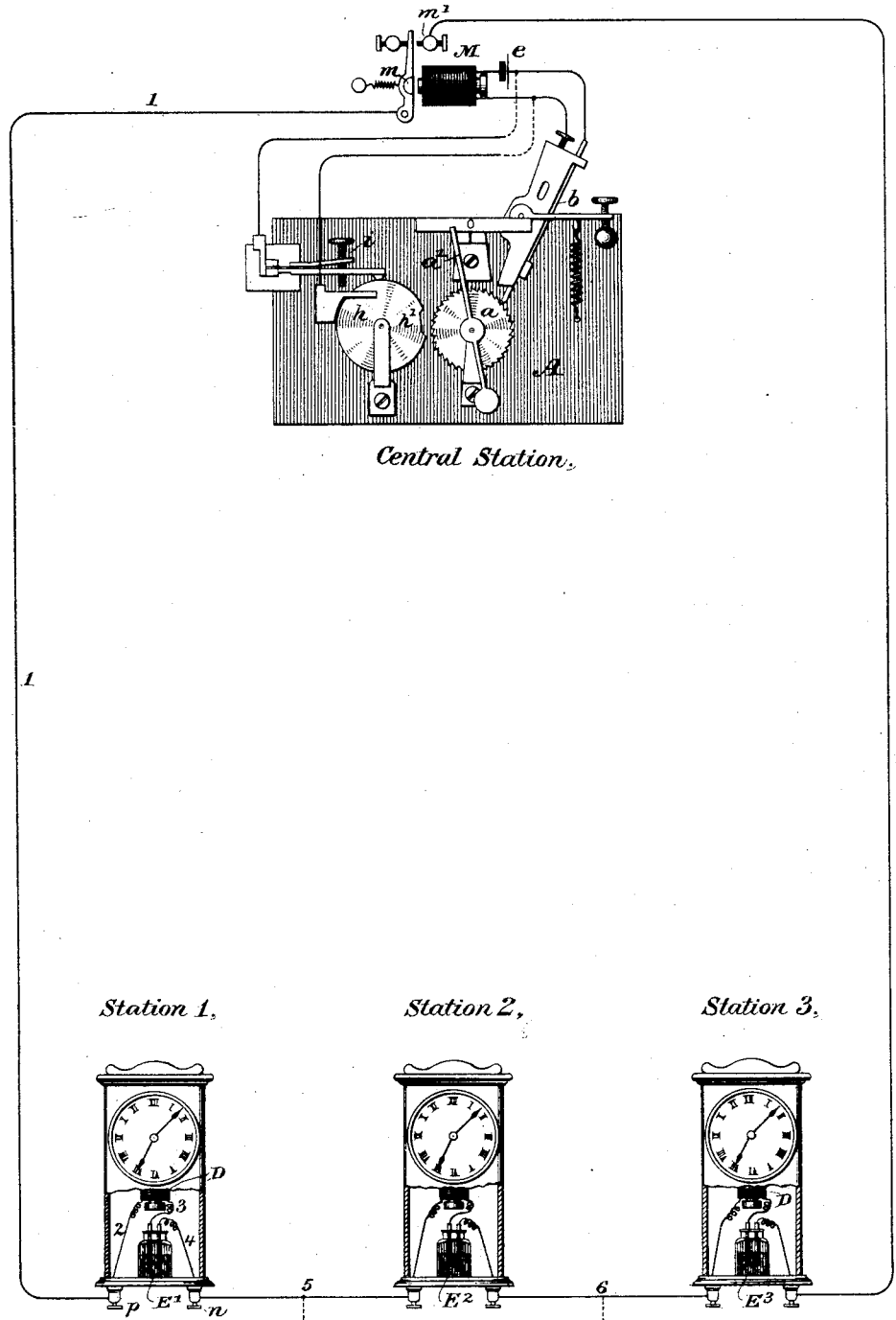

UNITED STATES PATENT OFFICE.

HENRY L. BAILEY, OF BROOKLYN, NEW YORK.

CIRCUIT FOR SECONDARY ELECTRIC CLOCKS.

SPECIFICATION forming part of Letters Patent No. 284,355, dated September 4, 1883.

Application filed July 17, 1883. (No model.)

*To all whom it may concern:*

Be it known that I, HENRY L. BAILEY, a citizen of the United States, residing in Brooklyn, in the county of Kings and State of New York, have invented certain new and useful Improvements in Systems of Circuits for Secondary Electric Clocks, of which the following is a specification.

My invention relates to an improved organization of electric circuits and electric generators designed for use in connection with systems of telegraphy in which a number of secondary or receiving instruments are simultaneously actuated in unison by impulses transmitted at predetermined intervals from the central station by means of a circuit-breaking or circuit-closing transmitter, the invention being especially applicable to systems of secondary clocks or time-pieces controlled or propelled by electrical impulses transmitted from a standard clock or time-piece at a central station.

The object of my invention is to effect such a distribution of the electro-motive forces by which the actuating-current of the line is generated that the strength of such current will practically be unaffected by an increase or decrease in the number of secondary clocks or time-pieces included in the circuit, or by the occurrence of faults or the failure of insulation upon the line, whereby one or more of said clocks may be accidentally short-circuited or thrown out of action.

Heretofore it has been the practice to place the whole of the voltaic battery or other electric generator at some one point in the circuit, usually at the central station, in the immediate vicinity of the primary instrument or circuit-breaking transmitter.

My improvement consists in dispensing with the battery or generator heretofore placed at the central station, and in distributing the electro-motive force in different parts of the circuit by making use of the requisite number of small detached batteries, the aggregate electro-motive force of which is approximately equal to that of the single assembled battery heretofore employed at the central station. One of these independent batteries is included in the main circuit at or in connection with each secondary clock or instrument, and its electro-motive force is so adjusted that its ratio to the sum of the electro-motive forces in the circuit is the same or approximately the same as the ratio of its internal resistance plus the resistance of the electro-magnet of its associated clock or receiving-instrument is to the sum of all the resistances in the circuit. Hence it will be apparent that when any one of the secondary instruments is withdrawn from the system, either intentionally or accidentally, the resistance of the circuit is necessarily diminished; but the total electro-motive force in the circuit is also proportionally diminished, and hence the effective strength of current in the line, which acts upon the remaining instruments, remains unchanged. By this means the necessity of readjusting the armatures of the secondary clocks is entirely avoided, inasmuch as their number may be increased or decreased to any desired extent without perceptibly affecting the proper performance of the remaining clocks.

The accompanying drawing is a diagram representing a common form of transmitting apparatus at a central station included in a circuit, with three secondary time-pieces to which my invention has been applied.

In the drawing, A represents the front clock-plate of the controlling time-piece at the central station, which may be of any suitable construction.

The toothed wheel $a$ is fixed upon the same arbor with the second-hand $a'$, and makes one revolution per minute under the action of a pendulum and escapement of well-known construction.

The wheel $a$ has thirty teeth. The teeth of this wheel as they revolve successively press against a delicate insulated spring, $b$, which latter closes the circuit of a local battery, $e$, at the passage of each tooth. The local circuit traverses the coils of an electro-magnetic relay, M, whose armature $m$, when brought in contact with the contact-stop $m'$, closes the main circuit, and thus produces electric pulsations through that circuit, as hereinafter described.

A metallic circuit is preferably employed for conveying the electric pulsations through the series of secondary clocks, and it may be traced in the diagram as follows: from the armature $m$ of the relay M, by wire 1, to the binding-screw $p$ of the secondary clock at station 1; thence by wire 2 to the electro-magnet D, by which said clock is actuated or controlled; thence by wire 3 to one pole of a battery, E', preferably placed within or attached to the case of the clock; thence by wire 4 to binding-screw $n$; thence by wire 5 to the next clock of the series at station 2, which is arranged in precisely the same manner as the clock which has just been described at station 1, being in like manner provided with a battery, $E^2$; thence by the wire 6 to the electro-magnet and the battery $E^3$ of the clock at station 3, and thence, returning by wire 7, to the contact-stop $m'$ of the relay M at the central station.

The independent batteries E', $E^2$, and $E^3$ are inserted in the line with their respective unlike poles toward each other, so that they will all tend to produce a current traversing the line in the same direction. In order to more certainly insure the placing of these batteries in their proper relation to the line, I prefer to distinguish either the poles of the battery or the binding-screws by which the line is connected to the clock by means of suitable marks or letters to prevent mistake.

In a system of this description the electric resistance of the line-wire or conductor forms but a comparatively small portion of the total resistance of the circuit, the latter being mainly composed of the aggregate resistance of the several electro-magnets by which the secondary clocks are operated; hence the total resistance will in all cases be very nearly in direct proportion to the number of secondary clocks or instruments in the circuit. It will therefore be obvious that by taking care that the electro-motive forces of the several detached batteries E', $E^2$, and $E^3$ are equal to each other, and that the ratio which the electro-motive force of each battery bears to that of the total electro-motive force in the whole circuit is approximately the same as the ratio of the resistance of the electro-magnet and battery of each individual secondary clock to that of the entire circuit, any required number of secondary clocks may be inserted in or withdrawn from the circuit, together with their electro-magnets and batteries, without perceptibly or practically changing the actual strength of current in the line. The same result follows in case of the occurrence of an accidental earth-connection at two points upon the line. For example, if the wire 5 should become accidentally connected with the earth at G, as indicated by the dotted line, and at the same time the wire 6 was in like manner connected with the earth at $G^2$, it is evident that the current traversing the line would find a route of minimum resistance from the wire 5 to the wire 6 through the earth, and hence the clock at station 2 in the drawing, or any number of secondary clocks which might be situated between the two points at which the faults occur, would be short-circuited or cut out, the effect of which would be to reduce the total resistance of the line in proportion to the number of clocks thus short-circuited. The strength of curent through the remaining clocks would therefore be materially increased were it not for the fact that a like proportion of the total electro-motive force of the circuit must necessarily be removed at the same time, and hence the effective strength of current traversing the uninjured portion of the circuit remains practically the same as before.

In case it is preferred to move the hands of the secondary clocks at intervals of one minute, instead of at each successive second, a wheel, $h$, upon the central clock, having a notch, $h'$, cut in its circumference, may be made use of, which acts upon a suitable circuit-closing or circuit-breaking device, $i$, actuating the relay M in the manner already described. The wheel $h$ is of course connected with the mechanism of the clock in such a manner as to perform one complete revolution per minute.

I claim as my invention—

The combination, substantially as hereinbefore set forth, with an electric circuit, a circuit-breaking time-transmitter, and two or more electro-magnets for actuating secondary time-pieces included in said circuit, of an independent battery or electric generator included in said circuit at each secondary instrument, whose electro-motive force bears approximately the same ratio to the sum of the electro-motive forces in said circuit that its resistance, together with that of the electro-magnet of its associate instrument, does to the sum of the resistances in circuit.

In testimony whereof I have hereunto subscribed my name this 16th day of July, A. D. 1883.

HENRY L. BAILEY.

Witnesses:
MILLER C. EARL,
CARRIE E. DAVIDSON.